(12) United States Patent
Frait et al.

(10) Patent No.: US 8,851,861 B2
(45) Date of Patent: Oct. 7, 2014

(54) POWERTRAIN HYDRAULIC SYSTEM FOR HYBRID ELECTRIC VEHICLES

(75) Inventors: Steven A. Frait, Milan, MI (US); Steven G. Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 13/362,047

(22) Filed: Jan. 31, 2012

(65) Prior Publication Data
US 2013/0192949 A1 Aug. 1, 2013

(51) Int. Cl.
| | |
|---|---|
| F04B 49/00 | (2006.01) |
| F04B 17/00 | (2006.01) |
| F04B 35/04 | (2006.01) |
| F16H 3/72 | (2006.01) |
| F16H 37/06 | (2006.01) |
| F16H 57/04 | (2010.01) |
| B60K 1/02 | (2006.01) |
| B60W 10/02 | (2006.01) |
| B60W 10/08 | (2006.01) |
| B60K 6/20 | (2007.10) |
| F16D 31/02 | (2006.01) |
| F16D 25/12 | (2006.01) |
| F16D 13/74 | (2006.01) |

(52) U.S. Cl.
USPC ........... 417/216; 417/410.1; 417/223; 475/5; 475/159; 477/3; 477/5; 192/85.63; 192/85.61; 180/65.21; 60/477

(58) Field of Classification Search
CPC ......... F16H 61/00; F16D 25/12; F04B 17/03; F04B 23/023; F04B 23/025; F04B 23/05
USPC ........... 477/3, 5; 475/5, 159; 180/65.21–65.8, 180/365; 60/477; 417/216, 423.3, 313, 417/410.1, 326, 223, 429; 192/85.63, 192/85.61, 3.33
See application file for complete search history.

(56) References Cited

U.S. PATENT DOCUMENTS

| | | | | |
|---|---|---|---|---|
| 4,179,889 | A * | 12/1979 | Gondek | 60/477 |
| 6,571,895 | B2 * | 6/2003 | Weimer | 180/65.1 |
| 6,647,326 | B2 * | 11/2003 | Nakamori et al. | 701/22 |
| 2008/0093135 | A1 * | 4/2008 | Nomura et al. | 180/65.2 |
| 2008/0308355 | A1 | 12/2008 | Kakinami et al. | |
| 2009/0074590 | A1 | 3/2009 | Tsuda | |
| 2009/0105918 | A1 | 4/2009 | Kobayashi et al. | |
| 2009/0271079 | A1 | 10/2009 | Kobayashi et al. | |
| 2010/0228451 | A1 | 9/2010 | Hosoya et al. | |
| 2010/0228452 | A1 | 9/2010 | Hosoya et al. | |
| 2011/0239818 | A1 * | 10/2011 | Kasuya et al. | 74/665 A |
| 2011/0240431 | A1 * | 10/2011 | Iwase et al. | 192/3.29 |
| 2011/0240451 | A1 * | 10/2011 | Park et al. | 200/5 A |

FOREIGN PATENT DOCUMENTS

WO       WO2012/034031 A2 * 3/2012

* cited by examiner

Primary Examiner — Devon Kramer
Assistant Examiner — Lilya Pekarskaya
(74) Attorney, Agent, or Firm — David B. Kelley; MacMillan, Sobanski & Todd, LLC

(57) ABSTRACT

A hydraulic system for a vehicle powertrain includes a module including a clutch, an electric machine and a first sump, a transmission including a line pressure source and a second sump, and a pump that supplies fluid from the first sump to the line pressure source when the source of line pressure is unavailable, and supplies fluid from the first sump to the second sump when fluid volume in the second sump is low.

19 Claims, 5 Drawing Sheets

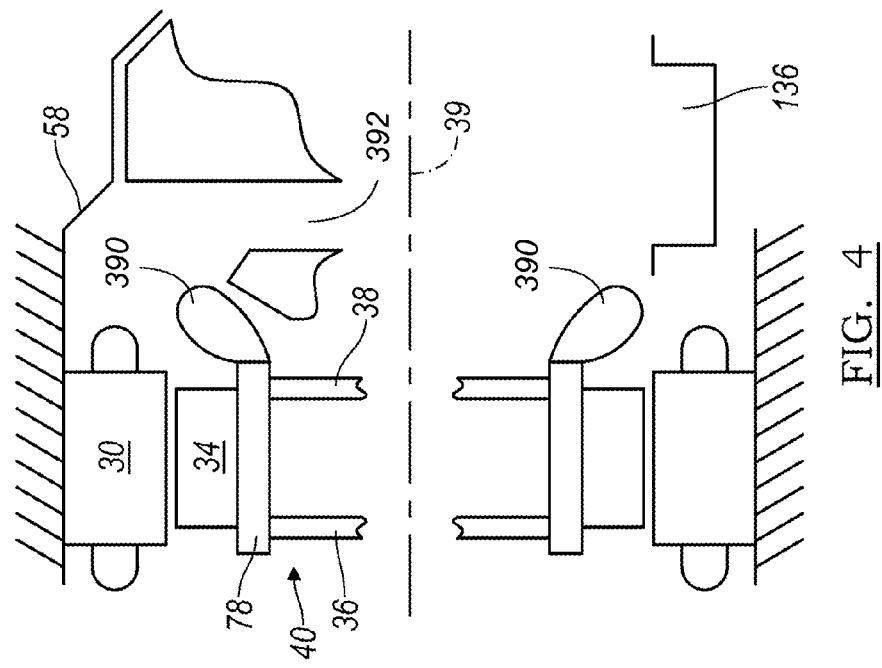
FIG. 4
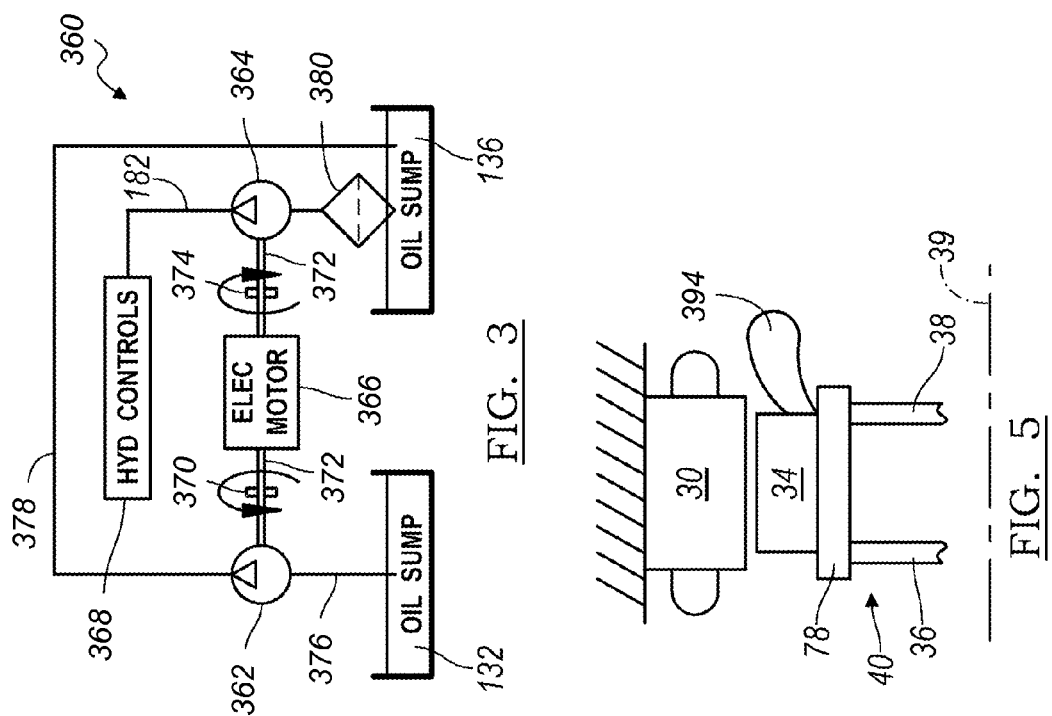
FIG. 3
FIG. 5

POWERTRAIN HYDRAULIC SYSTEM FOR HYBRID ELECTRIC VEHICLES

BACKGROUND OF THE INVENTION

1. Field of the Invention

This invention relates to a powertrain of hybrid electric vehicles, particularly to a powertrain module that can be installed between and secured to an engine output and a transmission input.

2. Description of the Prior Art

Hybrid electric vehicles have both an internal combustion engine and an electric machine which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles.

The module would include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module would provide an oil sump containing hydraulic fluid delivered to the module, and a path for continually returning that fluid to the transmission's oil sump so that the transmission pump is continually supplied reliably with fluid.

Use of such a module requires a hydraulic system that supplies fluid from the second sump to the line pressure source and line pressure is unavailable as when the engine is turned off to conserve fuel while the vehicle is stopped. The hydraulic system would supply fluid from a sump in the module to the transmission sump when the volume of fluid in the transmission sump is low enough to risk air ingestion into the inlet of the transmission pump, as when the vehicle is stopped while on a grade whose slope causes fluid to be retained in the module sump.

SUMMARY OF THE INVENTION

A hydraulic system for a vehicle powertrain includes a module including a clutch, an electric machine and a first sump, a transmission including a line pressure source and a second sump, and a pump that supplies fluid from the second sump to the line pressure source when the source of line pressure is unavailable, and supplies fluid from the first sump to the second sump when fluid volume in the second sump is low.

The pump supplies fluid from the second sump to the line pressure source when the pump rotates in a first direction and line pressure is unavailable. The pump supplies fluid from the first sump to the second sump when the pump rotates in a second direction opposite the first direction. The pump supplies fluid drawn from the second sump to the line pressure source when line pressure from the line pressure source is relatively low and the pump rotates in a first direction The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a schematic diagram of an alternate hydraulic system for use with the module of FIG. 1;

FIG. 4 is schematic side view of the rotor and stator of the electric machine showing the rotor hub supporting paddles;

FIG. 5 is schematic side view of the rotor and stator of the electric machine showing the rotor supporting paddles.

DESCRIPTION OF THE PREFERRED EMBODIMENT

Figure 1A:
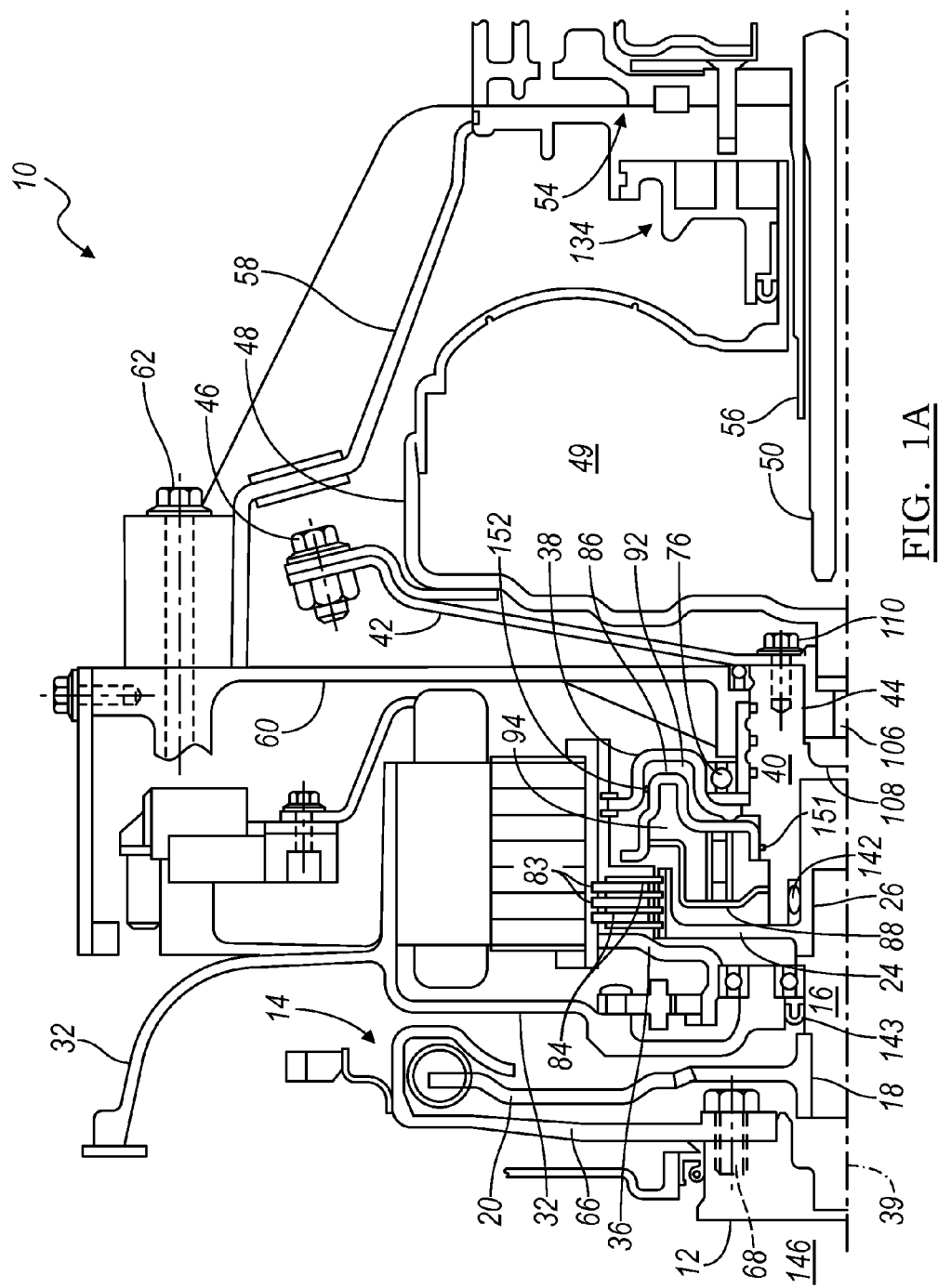
FIG. 1 is side cross-sectional view of a powertrain module showing a front connection to an engine output and a rear connection to a transmission torque converter input.
Figure 1B:
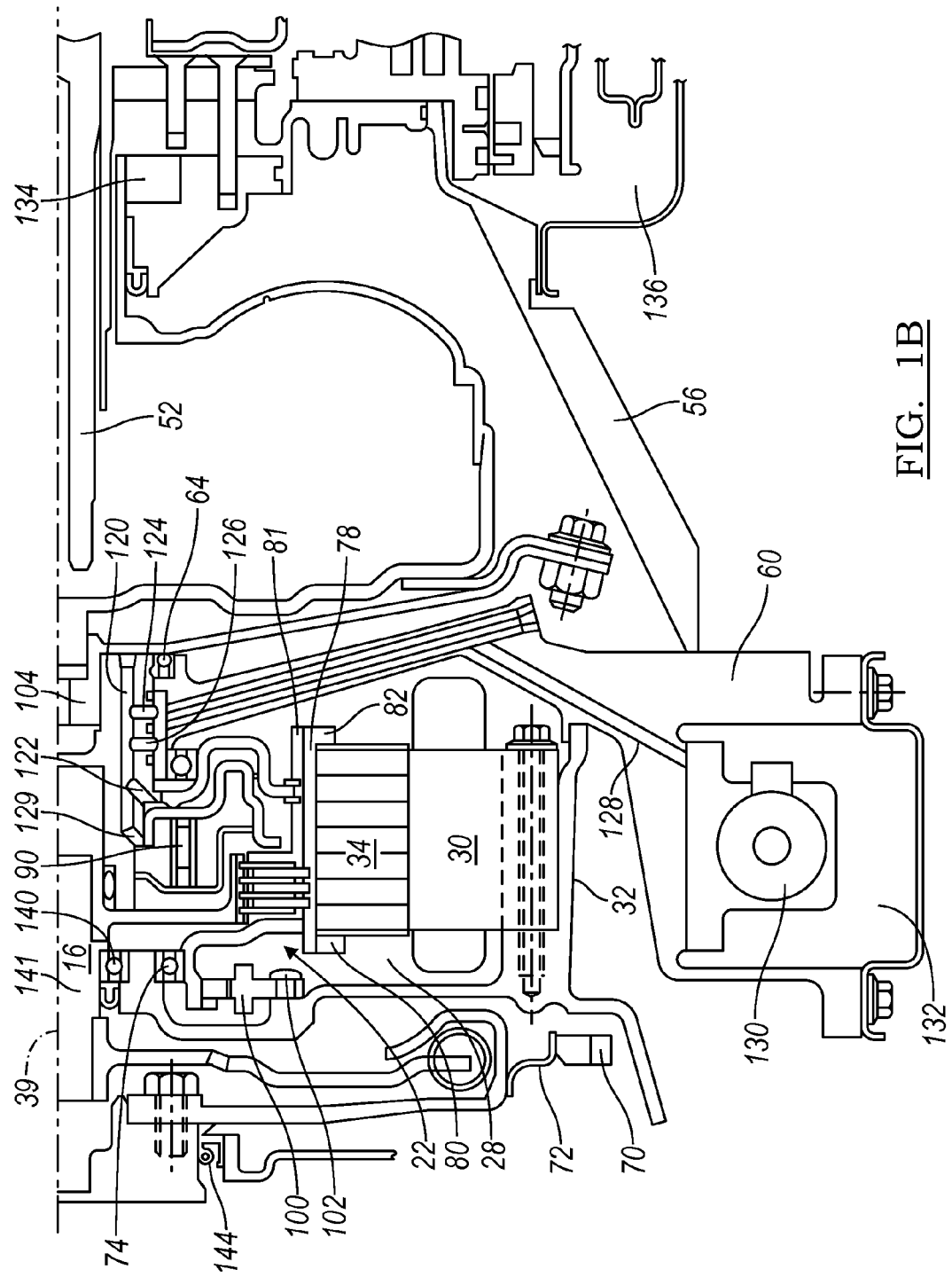

FIG. 1 illustrates a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32, and is located axially between the first and second bulkheads 32, 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 122, 124, 126, 129, which carry hydraulic fluid and pressure to module 10 from the hydraulic system of the transmission 54. Passages 122, 124, 126, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and leg 38, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 143, fitted in the front bulkhead 32, prevent passage of fluid from module 10 located between the bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch is disengaged; and by both the engine and electric machine concurrently.

Figure 2:
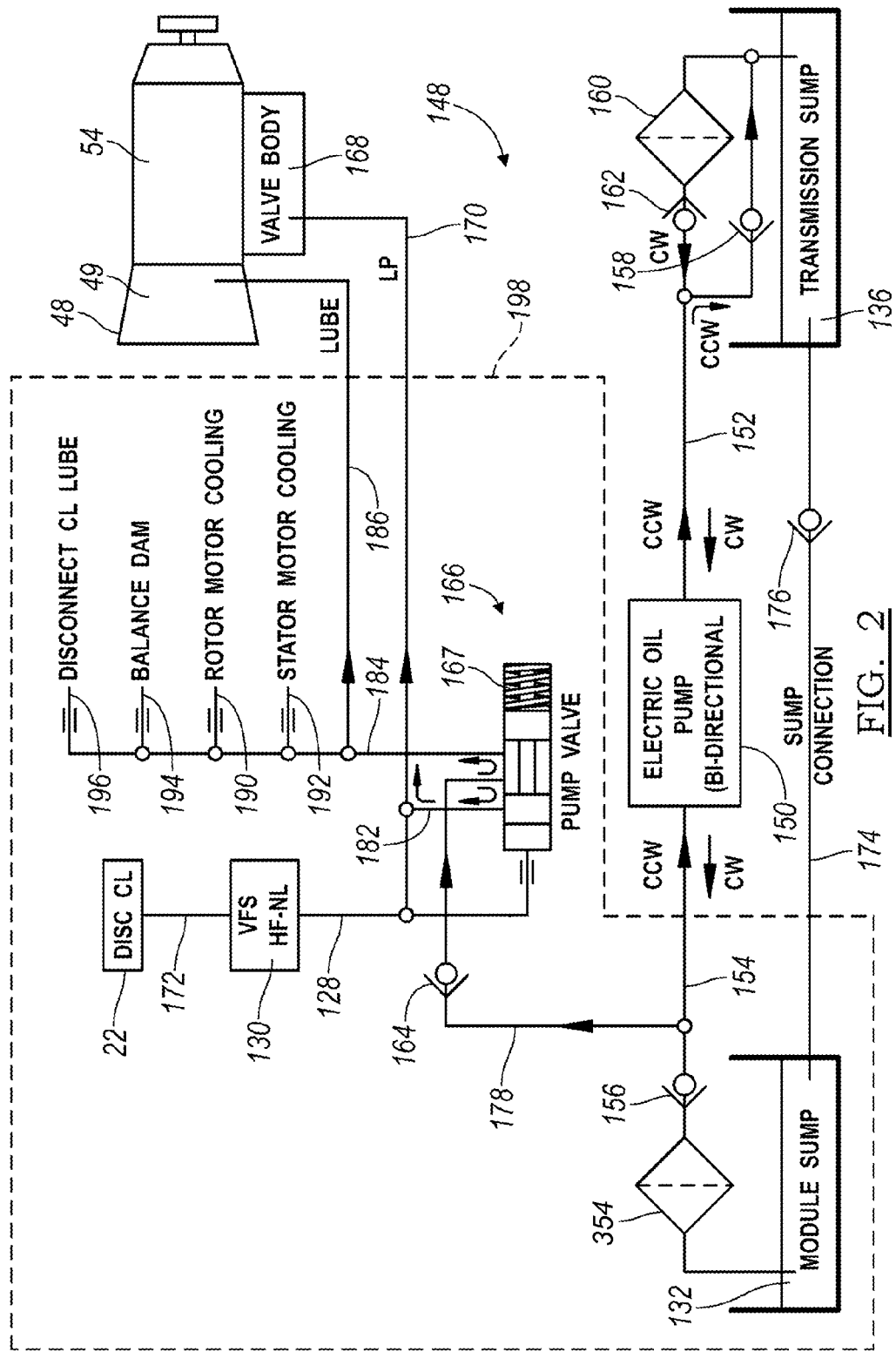
FIG. 2 is a schematic diagram of a hydraulic system for use with the module of FIG. 1.

The hydraulic system 148 of FIG. 2 includes a bidirectional electric pump 150, i.e., a pump driven by an electric motor that rotates in opposite directions, the pump being able to pump hydraulic fluid in either direction through lines 152, 154. Pump 150 can draw fluid from the module sump 132, through a filter 354, check valve 156 and line 154 into the pump and deliver fluid through line 152 and check valve 158 into the transmission sump 136. Pump 150 can draw fluid from the transmission sump 136 through a filter 160, check valve 162 and line 152 into the pump and deliver fluid through line 154 and check valve 164 to a control valve 166.

Fluid at line pressure exits the valve body 168 of the transmission hydraulic system and is carried in line to valve 166 and to normally low, high-flow solenoid-operated valve 130. Disconnect clutch 22 is actuated by fluid and pressure in line 172 from solenoid-operated valve 130.

Line 174 and check valve 176 provide a connection through which fluid can flow in one direction, i.e., from module sump 132 to transmission sump 136.

Each of check valves 156, 158, 162, 164, is preferably in the form of a ball check valve and check valve 176 preferably in the form of a hinged flapper door, although as an alternative a ball check valve can be used.

If the mechanical pump of transmission 54 is rotating and supplying the transmission pump with fluid from transmission sump 136, rotation of pump 150 in the first direction draws fluid from sump 136 and supplies fluid through line 178 and check valve 164 to the pump control valve 166. Under such condition line pressure in line 170 is relatively high, valve 166 closes line 182 and opens a connection between lines 178 and 184, thereby producing supplementary lube flow in line 186 to the transmission 54 and torque converter 49, and flow in line 190 to cool the rotor 34, in line 192 to cool the stator 30, in line 194 to the balance dam volume 94, and in line 196 to lubricate the disconnect clutch 22.

If the mechanical pump of transmission 54 is rotating and supplying the transmission pump with fluid from transmission sump 136, rotation of pump 150 in the first direction draws fluid from sump 136 and supplies fluid through line 178 and check valve 164 to the pump control valve 166. Under such condition line pressure in line 170 is relatively high, valve 166 closes line 182 and opens a connection between lines 178 and 184, thereby producing supplementary lube flow in line 186 to the transmission 54 and torque converter 49, and flow in line 190 to cool the rotor 34, in line 193 to cool the stator 30, in line 194 to the balance dam volume 94, and in line 196 to lubricate the disconnect clutch 22.

When the transmission is facing down hill, the housing 198 that encloses module 10 tends to fill with oil. Check valve 176 in line 174 between the connected sumps 132, 136 minimizes flow into housing 198 and sump 132, but due to motor and clutch cooling fluid supplied through lines 190, 192, 194, 196, sump 136 tends to empty and sump 132 tends to fill when transmission 54 is inclined down hill. When the volume of fluid in sump 136 is insufficient or low, air ingestion at the inlet of the mechanical pump of transmission 54 can result. Rotation of pump 150 in a second direction opposite the first direction causes pump 150 to scavenge oil from module sump 132 through filter 354, check valve 156 and line 154 and to return that fluid through line 152 and check valve 158 to the transmission sump 136.

A strategy to control operation and the direction of rotation of pump 150 can include a vehicle inclinometer, the magnitude of electric power supplied to pump 150, and the use of global positioning systems or similar vehicle navigation.

The hydraulic system 360 of FIG. 3 includes an electric pump, i.e., a pump having a first rotor 362 and a second rotor 364, both rotors driven alternately in opposite directions by a bidirectional electric motor 366 able to rotate in opposite directions. A shaft 372, driven by motor 366, drives pump rotor 364 in a first direction (preferably clockwise) through a one-way clutch 374. A shaft 372, driven by motor 366, drives rotor 362 in a second direction (preferably counterclockwise) opposite to the first direction through a one-way clutch 370. One-way clutch 370 overruns when shaft 372 rotates in the first direction. One-way clutch 374 overruns when shaft 372 rotates in the second direction.

In operation, when motor 366 rotates in the second direction, pump rotor 364 is not rotating, one-way clutch 374 overruns, one-way clutch 370 drives pump rotor 362, which scavenges oil from module sump 132 through line 376 and returns that fluid through line 378 to the transmission sump 136.

When motor 366 rotates in the first direction, pump rotor 362 is not rotating, one-way clutch 370 overruns, one-way clutch 374 drives pump rotor 364, which feeds oil from transmission sump 136 through filter 380 and line 382 to the transmission line pressure source in valve body 368, thereby providing a source of line pressure to the transmission hydraulic controls when the mechanical pump of the transmission is not rotating.

FIG. 4 shows paddles 390 secured to the rotor hub 40 for slinging oil radially outward into a trough 392 which directs the oil from the module 10 into the transmission sump 136.

FIG. 5 shows paddles 394, which are secured to or formed integrally with an end plate of the rotor 34 rather than on the rotor hub 40.

Figure 6:
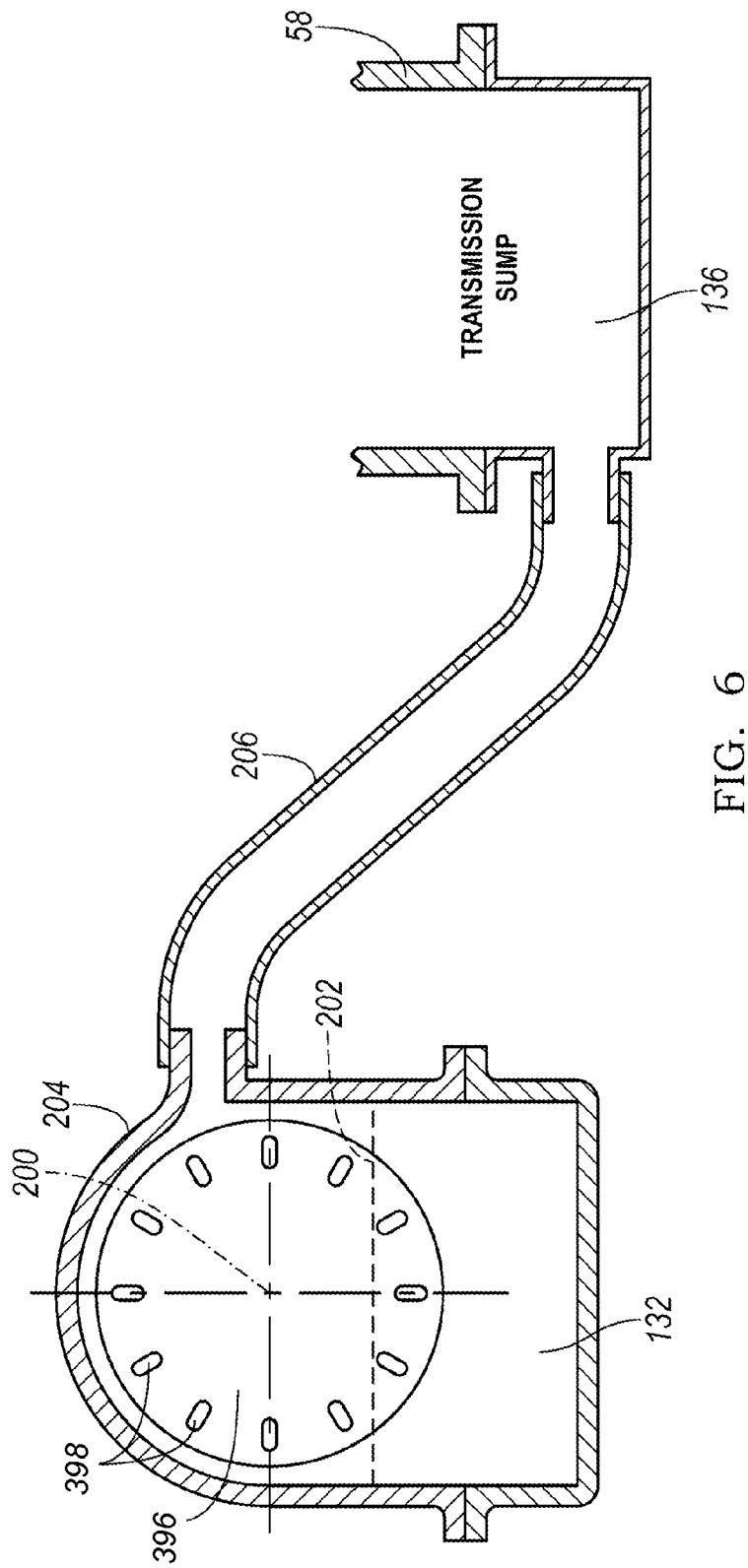
FIG. 6 is schematic side view of a rotor located in the module sump.

FIG. 6 shows a rotor 396 formed with paddles 398 spaced angularly about an axis 200, about which the rotor 396 rotates. The paddles 398 are located on the rotor 396 such that the paddles rotate through oil in the module sump 132. Oil in sump 132 reaches the elevation 202 when the vehicle is located on a downgrade for a period during which fluid from the transmission sump 136 is pumped or flows due to gravity into the module sump 132. A trough 204, located high in sump 132, directs fluid slung by the paddles 398 as they rotate in the sump into a drain back passage 206, which carries the fluid into the transmission sump 136.

In accordance with the provisions of the patent statutes, the preferred embodiment has been described. However, it should be noted that the alternate embodiments can be practiced otherwise than as specifically illustrated and described.

The invention claimed is:

1. A vehicle hydraulic system, comprising:
a module including a clutch, an electric machine and a first sump;
a transmission including a line pressure source and a second sump;
a pump that supplies fluid from the second sump to the line pressure source when the line pressure source is unavailable, and supplies fluid from the first sump to the second sump when fluid volume in the second sump is low.

2. The system of claim 1, further comprising:
an electric motor able to rotate in opposite rotary directions, and driveably connected to the pump.

3. The system of claim 1, wherein:
the pump supplies fluid from the second sump to the line pressure source when the pump rotates in a first direction; and
the pump supplies fluid from the first sump to the second sump when the pump rotates in a second direction opposite the first direction.

4. The system of claim 1, further comprising:
a valve that connects fluid drawn by the pump from the first sump to the line pressure source when line pressure from the line pressure source is relatively low and the pump rotates in a first direction.

5. The system of claim 1, further comprising:
a valve that connects fluid drawn by the pump from the second sump to the electric machine and the clutch when line pressure from the line pressure source is relatively high and the pump rotates in a first direction.

6. The system of claim 1, further comprising:
a valve that connects fluid drawn by the pump from the second sump to a source of lubricant for the transmission when line pressure from the line pressure source is relatively high and the pump rotates in a first direction.

7. The system of claim 1, further comprising:
lines for carrying fluid drawn by the pump from the first sump to the second sump when the pump rotates in a second direction.

8. The system of claim 1, further comprising:
an electric motor able to rotate in opposite rotary directions;
a first one-way clutch for transmitting in a first rotary direction rotating power produced the electric motor;
a first pump rotor for pumping fluid from the second sump to the line pressure source when the electric motor drives the first pump rotor in a first rotary direction through the first one-way clutch.

9. The system of claim 1, further comprising:
an electric motor able to rotate in opposite rotary directions;
a second one-way clutch for transmitting in a second rotary direction rotating power produced the electric motor;

a second pump rotor for pumping fluid from the first sump to the second sump when the electric motor drives the second pump rotor in a second direction through the second one-way clutch.

10. A vehicle hydraulic system, comprising:
a module including a clutch, an electric machine and a first sump;
a transmission including a line pressure source and a second sump;
a bidirectional electric motor;
a pump driven by the motor that supplies fluid from the second sump to a source of line pressure when the source of line pressure is unavailable and the pump rotates in a first direction, and supplies fluid from the first sump to the second sump when fluid volume in the second sump is low and the pump rotates in a second direction.

11. The system of claim 10, further comprising:
a valve that connects fluid drawn by the pump from the second sump to the source of line pressure when line pressure from the source of line pressure is relatively low and the pump rotates in the first direction.

12. The system of claim 10, further comprising:
a valve that connects fluid drawn by the pump from the second sump to the electric machine and the clutch when line pressure from the source of line pressure is relatively high and the pump rotates in the first direction.

13. The system of claim 10, further comprising:
a valve that connects fluid drawn by the pump from the second sump to a source of lubricant for the transmission when line pressure from the source of line pressure is relatively high and the pump rotates in the first direction.

14. The system of claim 10, further comprising:
supply lines for carrying fluid drawn by the pump from the first sump to the second sump when the pump rotates in the second direction.

15. The system of claim 10, further comprising:
a first one-way clutch for transmitting in the first direction rotating power produced the electric motor;
a first pump rotor for pumping fluid from the second sump to the source of line pressure when the electric motor drives the first pump rotor in the first direction through the first one-way clutch.

16. The system of claim 10, further comprising:
a second one-way clutch for transmitting in the second direction rotating power produced the electric motor;
a second pump rotor for pumping fluid from the first sump to the second sump when the electric motor drives a first pump rotor in the second direction through the second one-way clutch.

17. A vehicle hydraulic system, comprising:
a module including a clutch, an electric machine and a first sump;
a transmission including a line pressure source and a second sump;
a pump;
a valve that connects fluid drawn by the pump from the second sump to the line pressure source when line pressure from the line pressure source is relatively low and the pump rotates in a first direction;
lines for carrying fluid drawn by the pump from the first sump to the second sump when the pump rotates in a second direction.

18. The system of claim 17, further comprising:
an electric motor able to rotate in opposite rotary directions, and driveably connected to the pump.

19. The system of claim 17, wherein the valve connects fluid drawn by the pump from the second sump to the electric machine and the clutch when line pressure from the line pressure source is relatively high and the pump rotates in a first direction.

* * * * *